UNITED STATES PATENT OFFICE.

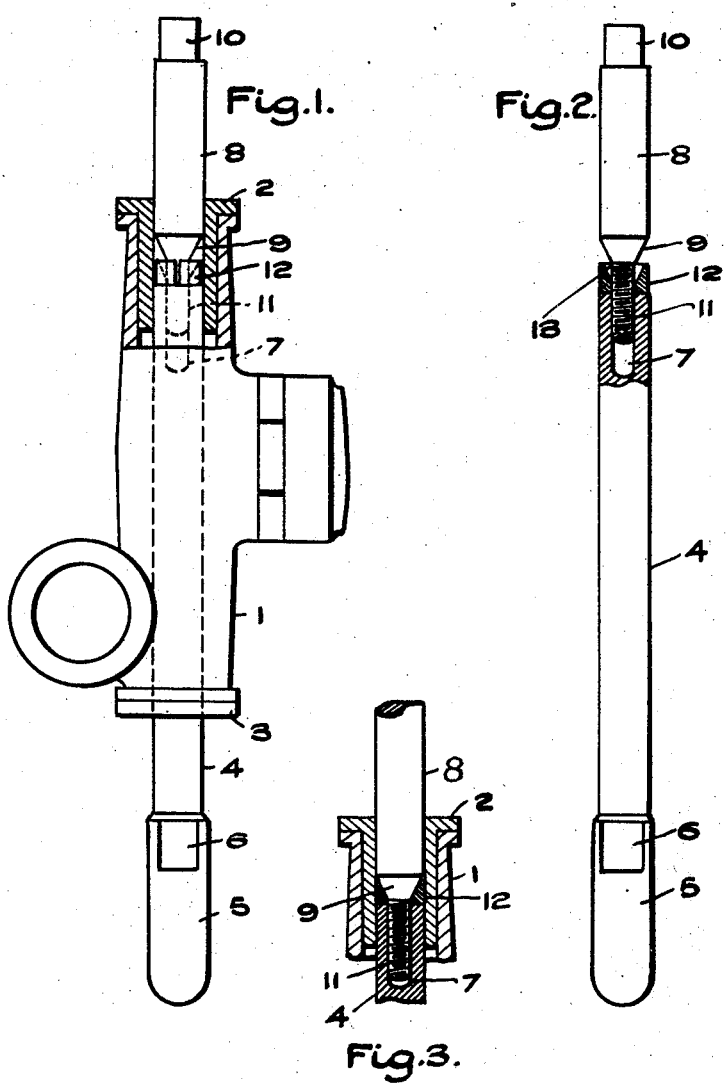

HERMAN KONOPASKA, OF PARIS, ONTARIO, CANADA.

BUSHING REMOVER.

1,391,837.  Specification of Letters Patent.  Patented Sept. 27, 1921.

Application filed May 3, 1920. Serial No. 378,641.

*To all whom it may concern:*

Be it known that I, HERMAN KONOPASKA, of the town of Paris, in the county of Brant, in the Province of Ontario, Canada, and a citizen of the United States, have invented certain new and useful Improvements in Bushing-Removers, of which the following is the specification.

My invention relates to improvements in bushing removers and the object of the invention is to devise a bushing remover which will readily remove bushings with greater facility than is at present the case. A further object is to construct a bushing remover which can be used on members wherein double bushings are used, as my bushing remover will readily remove one of the double bushings and the other one can either be removed by the present device or removed in the ordinary way.

My invention consists of a rod having a suitable head provided with flattened surfaces to take a wrench, and having a threaded orifice in the end opposite the head, a rod having a squared head adapted to take a wrench and the other end being tapered and provided with a threaded tongue adapted to be screwed into the aforesaid threaded orifice in the other rod, and a split ring having a tapered interior, and adapted to be interposed between the aforesaid rods, the tapered end of one of the rods adapted to engage the tapered interior of the ring whereby the ring is forced outwardly, all as hereinafter more particularly described and illustrated in the accompanying drawings in which—

Figure 1 represents an elevation of a bushing remover constructed according to my invention showing the same applied to the knuckle of an automobile front axle wherein double bushings are used.

Fig. 2 is an elevation of a bushing remover constructed according to my invention showing the same partly in section, and Fig. 3 is a sectional detail showing the rod with the tapered end screwed down into the tapered interior of the ring whereby the interposed ring is expanded against the bushing.

Like characters of reference indicate corresponding parts in the different views.

1 is the knuckle of an automobile front axle. 2 and 3 are the upper and lower bushings respectively. 4 is the rod of my bushing remover provided with the enlarged head 5, having the flattened surfaces 6 to take a wrench and provided at the other end with the threaded orifice.

8 is a second rod having the tapered lower end 9 and the squared head 10 also adapted to take a wrench. The tapered lower end 9 has a threaded tongue 11 formed thereon and adapted to be screwed down into the orifice 7 in the rod 4. 12 is a split ring having a tapered interior 13, the tongue 11 adapted to extend freely through the interior of said ring and said ring interposed between the rod 4 and the rod 8.

My bushing remover is particularly adapted to be applied where double bushings are used to facilitate the removal of the first of the bushings which at present is exceedingly difficult to remove.

The operation of the device is as follows:

The bushing remover is inserted through the member carrying the double bushing, such as the knuckle 1 shown in Fig. 1 until the ring 12 is more or less in the position shown in Fig. 1. When by applying a wrench to the head 10 of the rod 8 and to the flattened surfaces 6 of the rod 5 and turning such rods in opposite directions, the tongue 11 will be screwed down into the orifice 7 and the tapered end 9 will come into engagement with the tapered interior 13 of the ring 12 expanding such ring and forcing it into engagement with the interior of the bushing. When the ring has been expanded sufficiently the head 5 may be tapped with a hammer or other suitable tool. This will cause the bushing remover and the bushing which is now held thereto to be driven upward until the bushing is free from the knuckle 7.

From the above description it will be seen that I have devised a simple and effective bushing remover that will readily remove a bushing with much greater facility than is at present the case, particularly where double bushings are used and it is difficult to remove the first bushing.

It is to be understood that although I have described my device as applied to the knuckle of an automobile front axle, it could be applied wherever double bushings are used with equal facility.

What I claim as my invention is—

1. A bushing remover comprising a rod adapted to extend through a bushing, a split ring on said rod, and means operating against the opposite sides of the ring for expanding the split ring against the interior of said bushing.

2. A bushing remover, comprising a rod divided into two portions adjustably secured together, end to end, a split ring interposed between the two portions of the rod and means for expanding the split ring against the interior of the bushing.

3. A bushing remover comprising a rod divided into two portions, one portion having a threaded orifice in the end thereof and the other portion having a threaded tongue for screwing into the said orifice, a split ring through which the aforesaid tongue is passed so that the ring is interposed between the inner ends of the divided portions of the rod and means for expanding said ring into engagement with the interior of a bushing through which the remover is adapted to pass, as the divided portions of the rod are screwed together.

4. A bushing remover, comprising a rod divided into two portions adjustably secured together, end to end, one of said portions provided with a tapered end, and a split ring interposed between the said portions of the rod, said split ring having a tapered interior engaging with the tapered end on one of the portions of the rod.

5. In a bushing remover, the combination with a bushing, of a rod comprising two portions adjustably secured together, end to end, one of the portions having a threaded orifice and the other portion provided with a tapered end and a threaded tongue, said threaded tongue screwed into said orifice, and a split ring extending over the threaded tongue and having a tapered interior engaging with the tapered end on one of the portions of the rod.

HERMAN KONOPASKA.